Dec. 7, 1971 W. J. WARD III 3,624,983
MEANS FOR RAPID AND UNIFORM HEATING
OF A PACKAGED MEMBRANE SYSTEM
Filed March 2, 1970 3 Sheets-Sheet 1

Inventor:
William J. Ward, III,
by *[signature]*
His Attorney.

Inventor:
William J. Ward, III,
by Leo S. MaLossi
His Attorney.

Inventor:
William J. Ward, III,
His Attorney.

United States Patent Office 3,624,983
Patented Dec. 7, 1971

3,624,983
MEANS FOR RAPID AND UNIFORM HEATING
OF A PACKAGED MEMBRANE SYSTEM
William J. Ward III, Schenectady, N.Y., assignor to
General Electric Company
Filed Mar. 2, 1970, Ser. No. 15,679
Int. Cl. B01d 59/12
U.S. Cl. 55—16  6 Claims

ABSTRACT OF THE DISCLOSURE

An arrangement for electrically heating a packaged flat-sheet membrane system is described. In the preferred construction the membrane package consists of a plurality of spaced electrically conducting immobilized liquid membranes disposed in substantially parallel surface-to-surface array in combination with manifolding means so as to define both a first group of flow volumes and a second group of flow volumes alternating between the first group. Electrical conductors are connected to make electrical contact with each liquid membrane. These electrical conductors may be connected to an alternating current power supply in a circuit containing an intervening switch. Heating of the packaged membrane system to optimum operating temperatures is accomplished by passing A.C. current through the liquid membranes.

BACKGROUND OF THE INVENTION

The invention herein described was made in the course of, or under, a contract with the United States Air Force.

U.S. patent application Ser. No. 686,432—Dibelius (now U.S. Pat. 3,503,850) is directed to an improved blood oxygenator in which thin, non-porous polymer membranes are employed to effect gas exchange with the blood flow of a patient external to the body. Direct current power is employed to charge metal separator screens located in the blood passages of the oxygenator for the purpose of reducing damage to the red blood cells. By imposing a negative electrical potential on the screen separators the red blood cells in the flowing blood stream are repelled from the screen during transit of the blood through the blood passage.

A confined liquid membrane having a porous electrode in contact with each surface thereof for the imposition of a direct current voltage across the liquid film is described in U.S. patent application Ser. No. 803,019—Ward filed Feb. 27, 1969. The liquid membrane contains a concentration of a non-volatile transporting specie in solution, the transporting specie being characterized by its capability for being oxidized or reduced from a first to a second valence state and for being reactive with some specific gas in at least one of the multiple valance states. By bringing the specific gas (or a gas mixture containing the specific gas) into contact with one side of the liquid membrane the imposed direct current electrical potential will induce carrier transport of that specific gas through the liquid membrane.

Both the Dibelius and the Ward patent applications are assigned to the assignee of the instant invention. Neither of these applications address themselves to the problem of controllably heating a packaged membrane system, nor could utilize A.C. current.

U.S. 3,413,095—Bramson discloses a membrane package employed as a blood oxygenator. The membrane material is described as permitting the ready diffusion of oxygen and carbon dioxide therethrough but not permitting the permeation of aqueous liquids. The oxygenator comprises a plurality of cells arranged in a stack. Water jackets are disposed at opposite sides of each cell. A heat exchange fluid (water) may be circulated through each water jacket to control the temperature of the cell. Structurally, this provision of a pair of water jackets for each cell greatly complicates the gas transfer device and the art is in need of simplier means for rapid and uniform heating of the membrane package.

SUMMARY OF THE INVENTION

This invention is applicable to those packaged membrane systems utilizing either (a) an electrically conducting membrane in combination with separator means made of electrically insulating material or
(b) electrically non-conducting membranes in combination with electrically conducting separator means.

electrical contact is made through the sealed exterior of the membrane package by current-carrying means to a plurality of the electrically conducting elements of the membrane/separator combination in the particular membrane system (either $a$ or $b$ above). These current-carrying means are connected externally of the membrane package to an alternating current power supply. A suitable switching mechanism is provided by which to activate or interrupt the heating circuit.

Passage of A.C. current through the electrical circuits so provided controllably, rapidly and uniformly heats the packaged membrane system. The construction for effecting heating in accordance with this invention is readily applicable to the simplified packaging procedures for flat sheet packaged membrane systems such are described in U.S. Patents 3,354,618—Dounoucos; 3,416,985—Dounoucos and 3,447,286—Dounoucos and in U.S. patent application Ser. No. 13,267—Neulander et al. (now U.S. Pat. 3,564,819) filed on or about Feb. 24, 1970. These aforementioned patents and patent application are incorporated by reference.

BRIEF DESCRIPTION OF THE DRAWING

The exact nature of this invention as well as objects and advantages thereof will be readily apparent from consideration of the following specification relating to the annexed drawing in which.

DESCRIPTION OF THE PREFERRED EMBODIMENT

The electrical heating means of the instant invention is applicable in particular to gas separation devices, gas concentrator devices and gas exchange devices (e.g. blood oxygenators) in which alternate layers of electrically conducting material or composition are separated by electrically non-conducting layers.

Figure 1:
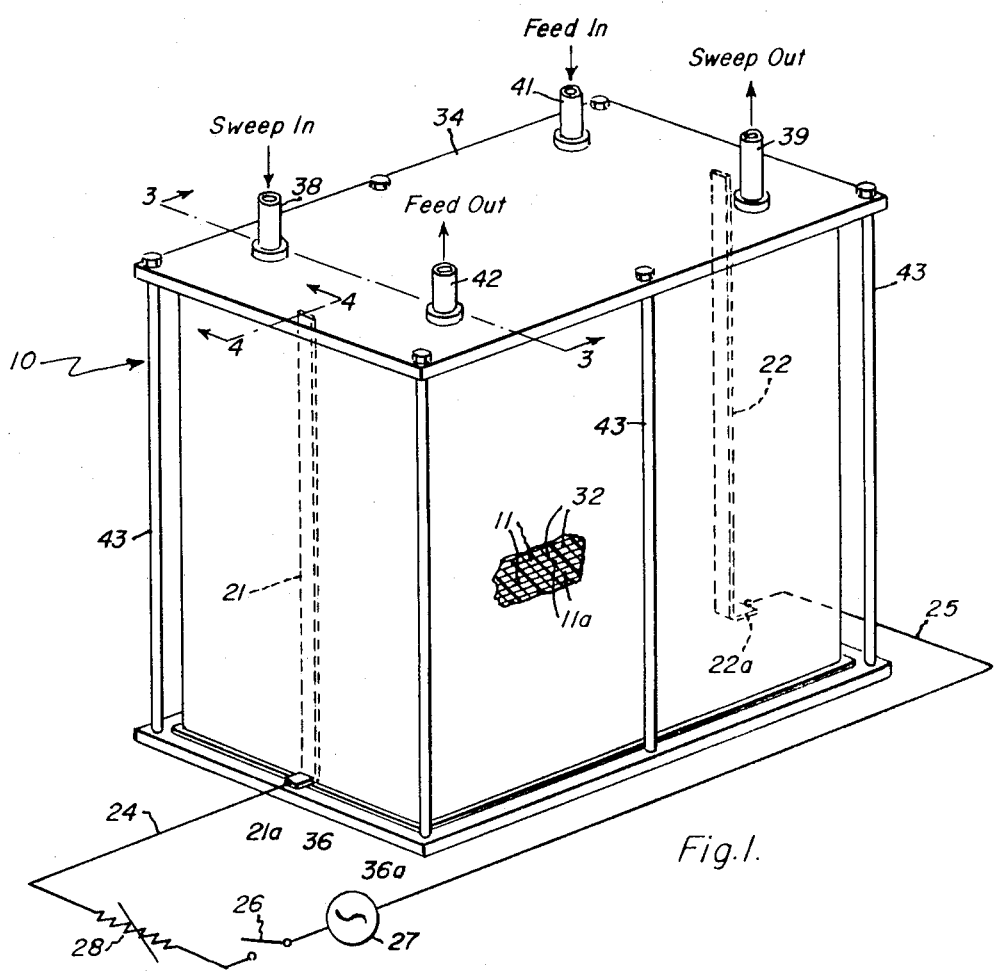
FIG. 1 is a three-dimensional view of a membrane package in which the instant invention may be employed.

The packaged membrane device 10 shown by way of example in FIG. 1 employs a repetitive flat-sheet stack arrangement comprising separator screen 11 (electrically non-conducting), membrane 12 (electrically conducting), separator screen 11a (electrically non-conducting)

and the next membrane 12 (electrically conducting). Any number of repetitions of this sequence may be employed. The particular screen configurations shown and their disposition in the stack to provide a novel manifolding arrangement as described herein constitute the invention described in the aforementioned Neulander et al. application. Description of these features is given herein simply to illustrate a typical structure to which the instant invention may be applied.

The electrically conducting immobilized liquid membranes 12 permit certain specific gases or vapors to pass therethrough to the substantial exclusion of others. The preparation of such membranes is disclosed in U.S. Patent 3,396,510—Ward et al.; U.S. Patent 3,335,545—Robb et al. and the aforementioned Neulander et al. application. Thus, immobilized liquid membrane 12 may comprise a matrix layer containing an interconnecting network of micropores, which pores are occupied by an electrolyte solution. The microporous matrix must, of course, be made of a material wet by the particular solution employed.

The typical electrically conducting liquid membrane comprises an aqueous solution containing a nonvolatile specie particularly selected to make available the phenomenon of facilitated transport in the membrane to more effectively carry on the desired gas separation.

An example of a microporous layer employable in this manner would be a sheet of the filter material sold under the trademark "Solvinert" (e.g. a sheet 5 mils thick and having 0.25 micron nominal pore size). The sheet of Solvinert is soaked in a cesium bicarbonate solution (about 6.4 N, pH of about 10) to permit the cesium bicarbonate solution to occupy the pores thereof.

Other materials useful as immobilizing mediums for liquid membranes include standard ultra-fine pore filter material, the ultra-fine porous polymer membrane disclosed in U.S. patent application S.N. 717,893—Weininger et al. (filed Apr. 1, 1968, now abondoned, and assigned to the assignee of the instant invention) and the materials described in U.S. Patents 3,378,507—Sargent et al.; 2,984,869—Honey et al.; 3,351,489—Larson et al.; 3,216,882—Feldt et al. and 3,062,760—Dermody. The disclosures of the afore-mentioned patent application and patents are incorporated herein by reference in their entirety.

Figure 2:
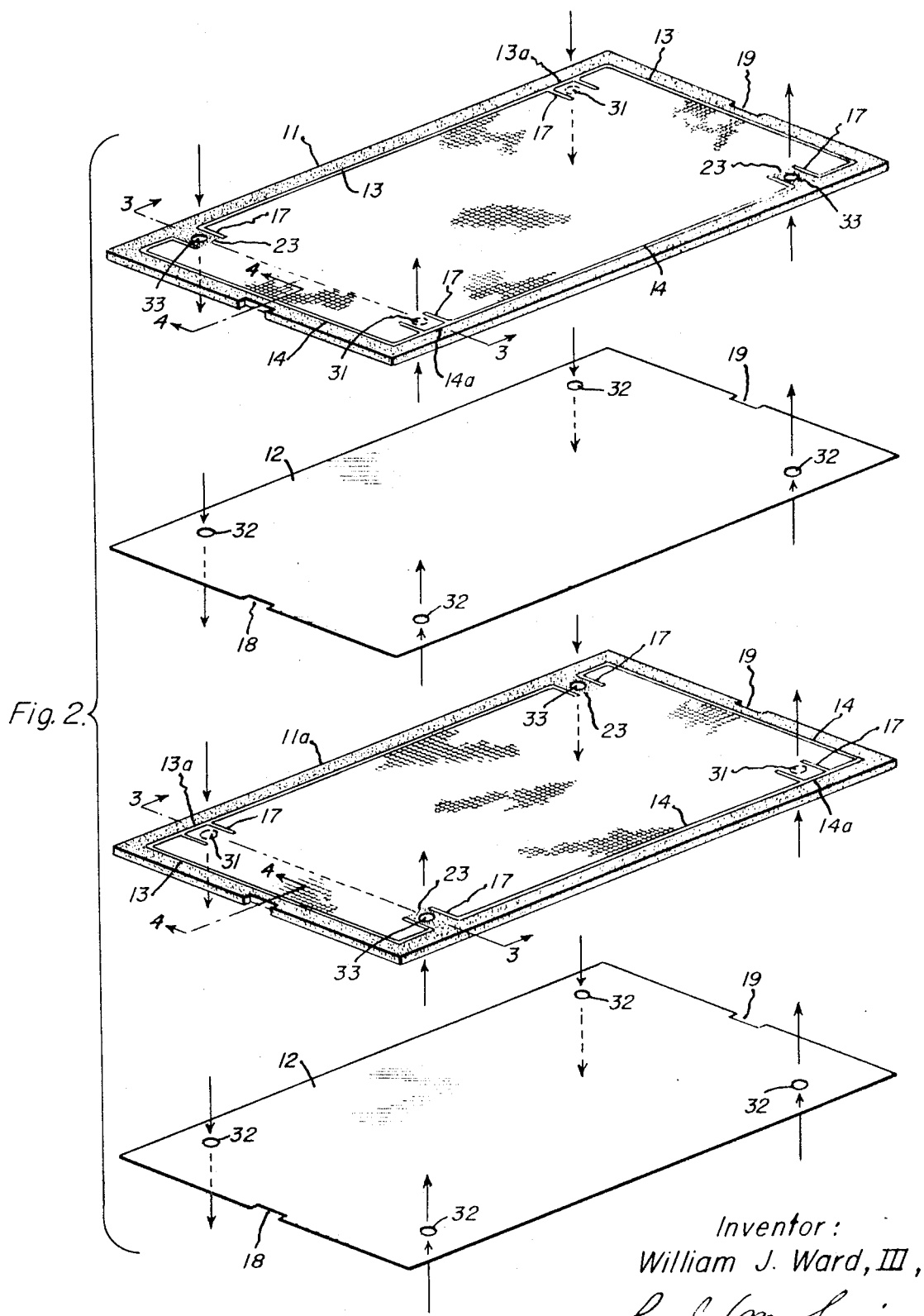
FIG. 2 is an exploded view of completed internal structure (the end plates are not shown) of FIG. 1 showing one arrangement by which current carrying means may be disposed in electrical contact with electrically conducting immobilized liquid membranes.

Separator screens 11, 11a are initially (prior to the modifications to be described hereinbelow) preferably woven screens made of electrically non-conducting material e.g. polyester monofilament screen cloth having mesh openings in the range of about 400 microns to about 1200 microns and an open area ranging from about 45 to 55 percent. Other sizes of mesh openings and percentages of open area may be used depending upon the strength of the membranes employed, the pressure difference prevailing across the membranes and the criteria to be set for fluid flow through the screens. Screens prepared from other materials may be employed so long as the material meets the criteria of electrical conductivity (or non-conductivity), retention of structural integrity under the operating conditions and compatibility with the fluids employed. Separator screens are prepared (prior to assembly) for the development of the manifold system by impregnating each separator screen with peripheral bead segments 13 and 14 and inwardly-directed bead extensions 17 as shown in FIG. 2. The beads should be of uniform height relative to the plane of the screen.

The bead material is preferably a self-setting liquid, which sets or cures as an elastomeric material and is chemically inert relative to the materials to which it will be exposed during use. Room temperature vulcanizing silicone rubber is such an elastomer. However, other materials such as wax or putty may be satisfactorily employed.

As may be seen from the drawing, the bead extensions 17 partially define small spaced areas, which fall into two categories, (a) those which are additionally defined by bead elements 13, 14 (note bead portions 13a, 14a,) and (b) those between which bead material is missing. Separator screen 11 differs from separator screen 11a only in its orientation in the assembly as shown in FIG. 2.

When the desired number of bead-impregnated separator screens have been prepared, the membranes 12 and separating screens 11, 11a are stacked so that each pair of membranes 12 has a separator screen therebetween. However, the disposition of the screen separators above and below any given membrane (as shown) differs in that bead portions 13a, 14a in the screen separator immediately thereabove will overlie locations in the separator screen immediately therebelow from which bead portions are missing. Bead portions 13a of alternate separator screens will be in vertical alignment and similarly bead portions 14a of alternate separator screens will be in vertical alignment.

When the package of membranes and separating screens has been made the assembly is clamped. At this time slots 18, 19 may be cut in each side of the assembly as shown. Current-carrying bars 21, 22 are inserted into slots 18, 19, respectively. Thereafter, each edge of the assembly (with bars 21, 22 in place) is immersed to a predetermined depth in a potting compound. The liquid potting compound enters the package through the exposed edges of the separator screens until it encounters beads 13 and 14, which prevents its further penetration, except for each defined area between bead extremities 17, where a gap exists between beads 13 and 14. In these areas and along the edge regions the potting compound is free to enter to the extent shown (stippled area) to form extensions 23 (when hardened). The potting liquid is specifically selected to have the following properties:

(a) it must wet the membrane surface,
(b) it must form an adhesive bond with the membrane material,
(c) It must be a viscous liquid containing little or no diluent,
(d) it must be chemically inert to the materials with which it must come into contact,
(e) it must be self-setting,
(f) it must set as a non-porous barrier (capable of preventing the flow of gas therethrough in those constructions in which gas separations are to be effected) and
(g) it must not be deteriorated by the heating current passed through the current-carrying means and electrically conducting layers.

An example of a suitable potting compound for use with Solvinert membranes in which a liquid membrane has been immobilized is a bisphenol-A based epoxy resin to which has been added a catalyst system consisting of a modified polyamine plus polyamide. Another useful potting material is polyester adhesive.

Figure 4:
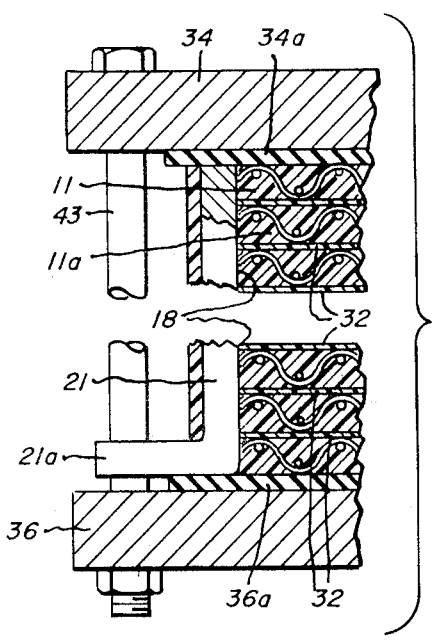
FIG. 4 is an enlarged sectional view taken on line 4—4 of FIG. 2.
Figure 3:
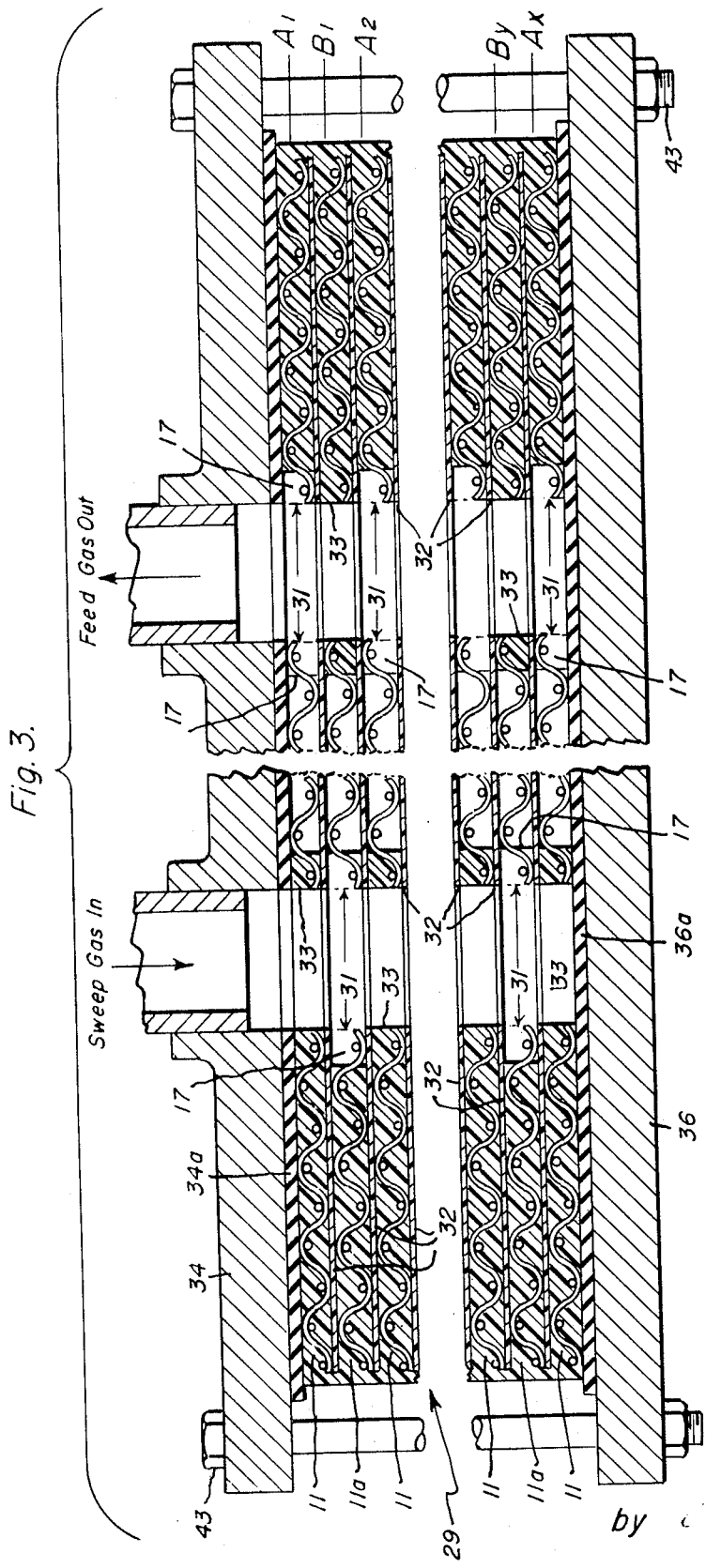
FIG. 3 is an enlarged sectional view taken on line 3—3 of FIGS. 1 and 2.

After completion of the plotting operation and subsequent curing, the edges of each membrane 12, current-carrying bars 21, 22 and the edge of each separator screen 11, 11a are bonded into unified walls as is shown in FIGS. 3 and 4. Projections 21a and 22a extending from bars 21 and 22, respectively, may then be stripped of potting compound to the extent required to make electrical connection thereto with leads 24, 25 in series with switch 26, A.C. source 27 and variable impedance 28 shown in FIG. 1.

When the plotting material has hardened, holes are drilled through package 29 transverse to the direction of the planes of the laminae. Each vertical pass of the drill results in a plurality of aligned holes in the sequence of layers. These are holes 31 (through the screen material only), holes 32 (through membranes 12), and holes 33 (through each extension 23 and the screen embedded therein) all in alignment.

The membrane package 29 is sandwiched between metal end plates 34, 36, and gaskets 34, 36a having holes 37 and 37a, respectively, matching with the vertical sequence of manifolding holes in the membrane package 29. End plates 34, 36 serve both to force the gaskets into sealing engagement with the membrane package 29 and to provide terminals for conduits 38, 39, 41, 42 as shown in FIG. 1. Fasteners 43 arranged around the perimeter of the device provide biasing force for the end plates.

Optionally, if the separating means are to carry the heating current, the first and last laminae of the membrane package 29 may be solid sheet, e.g. sheet metal to provide stiffness and protection for the package. When employed, such stiffener sheets become an integral part of the package after the potting operation. End plates and gaskets are then employed as described hereinabove.

Once leads 24, 25 have been connected to alternating current power source 27 and switch 28 has been closed heating of the package 29 proceeds quickly and uniformly.

Where the location of ultimate use (e.g. in an industrial plant or an aircraft) of the membrane package is one in which the system can be exposed to temperatures substantially below (e.g. $-50°$ F.) the optimum operating temperature for the membranes and where the use of the package is intermittent, rapid and uniform warming up of the system would be essential. By applying an appropriate alternating current to membranes 12 heating at a rate of about $50°$ C. in ½ hour may easily be obtained.

Initiation of operation of the membrane system can be conducted either during or after the heating has been accomplished. For operation of the membrane system a flow of feed gas entering through conduit 41 will exit via holes 31 to pass through the alternate flow volumes $B_1, B_2 \ldots B_y$ comprising flow volume group B. This feed gas stream sweeps over the surfaces of membranes 12 forming the boundaries thereof on its way to exit to conduit 42 via holes 31 at that vertical manifold as is shown in FIG. 1. simultaneously the sweep gas stream enters conduit 38 and is manifolded via holes 31 into flow channels $A_1, A_2 \ldots A_x$ comprising flow volume group A. The sweep gas stream exits via holes 31 from flow group A to leave the device via conduit 39 as is shown in FIG. 1.

Assuming a membrane package consisting of 250 membranes each 5 mils thick and one square foot in area of immobilized saturated cesium bicarbonate solution, such a package has a heat capacity of the order of 10,000 calories/° C. At a heating rate of $50°$ C. (increase in temperature) per half hour approximately 1000 watts is required. Saturated cesium bicarbonate solution has a resistance of 6 ohms-cm. and on this basis the 250 membranes (connected in parallel) would offer a resistance of 2.3 ohms. To dissipate 1000 watts as heat in the package a setting of variable impedance 28 to provide a current of 21 amps at a potential of 48 volts would be employed.

An alternate arrangement (not shown) for effectively electrically coupling to electrically conducting membranes 11, 11a would be to bond strips of metal ribbon along two opposite edges of each membrane 12 and make connection to each edge strip with a length of metal ribbon lead. By attaching the leads at the same positions in the preparation of each membrane the leads will be in vertical alignment in the assembly. These leads may be connected together in overlapping arrangement to form a pair of common leads leaving the assembly. Subsequent potting operations will result in holding in place of the leads with the common leads penetrating the potting compound sealing the edges of the assembly in order that electrical connections may be made to the electrical heating means.

Still another arrangement would be to suspend finely divided metal (e.g. copper, silver, etc.) in the potting compound in sufficient concentration that paths of electrical conduction will be provided through the cured potting compound. In such an arrangement current-carrying bars similar to those shown in FIGS. 1 and 4 need only be embedded in the potting compound eliminating the need for notches 18, 19.

Regardless of whether the membrane package employs electrically conducting separator screens interleaved with electrically non-conducting membranes or employs electrically non-conducting separator screens interleaved with electrically conducting membranes, the principles illustrated in FIGS. 1, 2 and 4 are applicable.

At least one of the two separate fluid flows that pass through the membrane package will come from some clearly identifiable source (e.g. breath exhaled into a respirator as described in U.S. Pat. 3,489,144—Dibelius et al., incorporated by reference) and leave the membrane package in a specific flow path to reach a definite terminus. The second fluid flow may, or may not, have similarly definitive source and/or terminus. In a closed cycle breathing system, for example, exhaled breath from a person wearing a respirator is conducted to a membrane package where it flows through one set of flow channels (i.e. flow channels B). After reduction of the $CO_2$ content thereof this fluid leaves the membrane package for completion of the closed cycle. The second (sweep) fluid in such a case may be drawn from the ambient, passed through the second set of flow channels (i.e. flow channels A) and then discharged to the ambient.

Optionally, the second fluid may be circulated in a closed cycle, if the economics of the separation operation require retention of the component transferred from the first to the second fluid in the membrane package.

In those systems in which the temperature differentials to which the membrane package are subjected between shut-down and operating conditions are small, the necessary warm up may be accomplished by heating the incoming fluids. However, when this temperature differential is large, hours will be required for the heat-up to occur. Long periods of exposure to hot dry gases can be very damaging to immobilized aqueous membranes in particular.

What I claim as new and desire to secure by Letters Patent of the United States is:

1. In a system for the transfer of at least one component from a first fluid to a second fluid within a membrane package wherein a plurality of membranes are disposed in substantially parallel surface-to-surface array spaced apart by separator screens to provide a plurality of flow volumes defined by said membranes and edge-sealing means, said flow volumes being separated into mutually exclusive first and second groups of flow volumes; first and second manifold means are provided in flow communication with said first and second groups of flow volumes respectively, and separate means are connected to said first and second manifold means (a) for introducing a first fluid to and removing the first fluid from said first group of flow volumes and (b) for introducing a second fluid to and removing the second fluid from said second group of flow volumes, the improvement in which the membranes and separator screens present a series of electrically conducting layers separated by electrically non-conducting layers, current-carrying means are connected to said electrically conducting layers and an alternating current power source for controlled resistance heating of the electrically conducting layers in order to heat the membrane package is connected to said current carrying means by means of external circuitry.

2. The improvement in claim 1 wherein the membranes are electricaly conducting and comprise immobilized electrolyte solutions.

3. The improvement in claim 1 wherein the external circuitry includes means for varying the impedance thereof.

4. The improvement in claim 1 wherein the current-carrying means fits into aligned recesses cut into the edges of the membranes and separator screens.

5. In the process of effecting the transfer of at least one component from a first fluid to a second fluid by passing said fluids over opposite surfaces of spaced membranes defining first and second groups of fluid flow volumes in combination with separator screens disposed between each pair of said membranes, the improvement of selecting the membranes and separator screen to provide a series of electrically conducting layers separated by electrically non-conducting layers and controllably passing alternating current through said electrically conducting layers whereby controllable resistance heating of said series of layers is accomplished and said one component is transferred from said first fluid through said membranes to said second fluid.

6. The improved process of claim 5 wherein the membranes are electricallly conducting and comprise immobilized electrolyte solutions.

References Cited

UNITED STATES PATENTS

| | | | |
|---|---|---|---|
| 3,520,803 | 7/1970 | Iaconelli | 55—16 |
| 3,416,985 | 12/1968 | Dounoucos | 55—16 |
| 3,359,707 | 12/1967 | Jean | 55—179 |
| 3,447,286 | 6/1969 | Dounoucos | 55—16 |
| 3,447,288 | 6/1969 | Juda et al. | 55—158 |
| 3,355,861 | 12/1967 | Major et al. | 55—158 |

CHARLES N. HART, Primary Examiner

U.S. Cl. X.R.

55—267; 210—321